(12) United States Patent
Lodha

(10) Patent No.: US 7,330,430 B2
(45) Date of Patent: Feb. 12, 2008

(54) PACKET-BASED TRAFFIC SHAPING

(75) Inventor: Sandeep Lodha, Sunnyvale, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 1080 days.

(21) Appl. No.: 10/352,829

(22) Filed: Jan. 27, 2003

(65) Prior Publication Data
US 2003/0223445 A1 Dec. 4, 2003

Related U.S. Application Data

(60) Provisional application No. 60/385,920, filed on Jun. 4, 2002.

(51) Int. Cl.
*H04L 12/26* (2006.01)
(52) U.S. Cl. ............................................. 370/230.1
(58) Field of Classification Search ............... 370/229, 370/230, 230.1, 395.4, 395.41, 395.42, 428, 370/429
See application file for complete search history.

(56) References Cited

U.S. PATENT DOCUMENTS

| | | | | |
|---|---|---|---|---|
| 5,978,356 | A | 11/1999 | Elwalid | 370/230 |
| 6,052,375 | A * | 4/2000 | Bass et al. | 370/412 |
| 6,370,116 | B1 * | 4/2002 | Giroux et al. | 370/232 |
| 6,377,583 | B1 | 4/2002 | Lyles | 370/412 |
| 6,381,649 | B1 * | 4/2002 | Carlson | 709/235 |
| 7,061,867 | B2 * | 6/2006 | Huang et al. | 370/235 |

* cited by examiner

*Primary Examiner*—Kwang Bin Yao
*Assistant Examiner*—Andrew Lai (57) ABSTRACT

A packet-based traffic shaping system including a scheduler that forwards packets in accordance with a scheduling algorithm from queues that have at least a minimum good credit rating. The minimum good credit rating is not dependent on the size of a packet that is to be forwarded. Rate shapers associated with the queues reduce credit by transmission costs associated with the packets and restore credit incrementally over time. When a queue is empty, credit does not accumulate above an idle credit value at the associated rate shaper. When a packet is enqueued in a queue that has been idle for a period of time, the packet is forwarded without undue delay.

25 Claims, 8 Drawing Sheets

PACKET-BASED TRAFFIC SHAPING

CROSS REFERENCE TO RELATED APPLICATION

This application is entitled to the benefit of provisional Patent Application Ser. No. 60/385,920, filed 4 Jun. 2002.

FIELD OF THE INVENTION

The present invention relates generally to controlling packet-based traffic flow, and more particularly to using rate-shaping tools to shape packet-based traffic.

BACKGROUND OF THE INVENTION

If a service provider is unable to control traffic flow, it is difficult for the service provider to deliver a reliable level of service to each of its subscribers. Controlling traffic flow, including rate limiting and traffic shaping, also referred to as rate shaping, is important to make sure traffic flows smoothly through a network. A method of controlling traffic entails placing a shaper at the head of a queue. Packets are placed in the queue, and then forwarded in accordance with the shaper and a scheduling algorithm implemented in a scheduler. The scheduler typically picks the queue from which a packet is to be forwarded using a scheduling algorithm (typically a round-robin scheduling algorithm). The scheduler can only pick a queue that is enabled by the shaper. The shaper prevents the scheduler from dequeuing packets at a rate that would exceed the limits that are enforced by the shaper.

A first category of traffic shaping involves reducing burstiness so that traffic is forwarded more steadily into a network. The first category is commonly implemented using a leaky bucket algorithm. A second category of traffic shaping includes permitting bursts of a predetermined size in order to present a burst-regulated stream of traffic to the network. The second category is commonly implemented using a token bucket algorithm. Each of these tools has different capabilities and results in output streams with different characteristics.

The leaky bucket algorithm turns a bursty stream of packets into a stream of more equally spaced packets. With the leaky bucket algorithm, a stream of packets is placed into a queue controlled by a leaky bucket shaper. Over time, the shaper accumulates tokens for sending packets. When the shaper has accumulated sufficient tokens to send the packet at the head of the queue, the scheduler may send the packet. However, when a packet arrives at the queue after an idle period, i.e., a period when no packets are in the queue, the shaper must accumulate tokens before the packet is sent, thereby causing the packet to be delayed. This delay is proportional to the packet size. The bigger the size of the packet, the higher the delay.

The token bucket rate-limiting algorithm enforces a long-term average transmission rate while permitting bounded bursts. Using this approach, a token generator generates tokens in advance of receiving a packet. This eliminates the delay that occurs with the leaky bucket algorithm after an idle period. However, the accumulated tokens may be used to send a series of small packets, when one small packet does not use all of the accumulated tokens. This increases the burstiness of the traffic.

In view of the desire to control traffic flow, what is needed is a new traffic shaping tool that does not delay traffic after idle periods in order to accumulate tokens before sending a received packet and, at the same time, does not accumulate tokens while idle, so that a plurality of small packets received after idle periods are sent in a steady stream, rather than a large burst.

SUMMARY OF THE INVENTION

A technique for shaping traffic involves allowing a packet received after an idle period to be sent without accumulating tokens during the idle period and without waiting to accumulate tokens such that credit equals or exceeds the transmission cost of the packet. The technique can readily be implemented in hardware with relatively few computational logic circuits and relatively little memory, making the hardware inexpensive and robust. The technique can be used to control traffic with accurate rate shaping in existing networks, even in dual or multiple rate shaping implementations.

In one embodiment, a method for packet-based traffic shaping includes establishing an idle credit value and a transmission credit restoration rate, enabling a queue irrespective of whether a transmission cost of a next packet in the queue is greater than a transmission credit that is associated with the queue, and incrementally restoring the transmission credit at the transmission credit restoration rate if there is another packet in the queue. If there is not another packet in the queue, incrementally restoring the transmission credit at the transmission credit restoration rate up to the idle credit value. In an embodiment, the idle credit value is zero.

In another embodiment, a system for controlling packet-based traffic flow includes queues configured to hold packets until they are forwarded, a rate shaper, associated with one of the queues, and a scheduler. Traffic, in the form of packets, is placed into the queues, which are typically first-in-first-out (FIFO) queues. The scheduler forwards packets from the queue in accordance with a scheduling algorithm if the queue is enabled. The rate shaper is configured to enable the queue to allow forwarding of a first packet if transmission credit has at least a minimum good credit value, reduce the transmission credit by a transmission cost associated with the first packet if the packet is forwarded, restore the transmission credit incrementally over time during an idle period to an idle credit value, and enable the queue to allow forwarding of a second packet made available for forwarding after the idle period when the transmission credit has at least the minimum good credit value.

In another embodiment, a rate shaper apparatus for use with a scheduler to accomplish rate shaping in a packet-based network includes a first register, a subtractor, and an adder. The first register contains a first value corresponding to transmission credit associated with a queue. The first value has an idle credit value after an idle period of sufficient duration to incrementally restore credit to the idle credit value. The queue is enabled when the first value has a predetermined minimum good credit value. The minimum good credit value is predetermined because it does not fluctuate with the size of a packet to be forwarded. The subtractor is for subtracting from the first value a transmission cost associated with a packet dequeued from the queue when the first value has the minimum good credit value. The result is loaded into the first register. The adder is for adding to the first value a second value corresponding to an amount of credit restored in a time increment. The sum is loaded into the first register if either another packet is enqueued, or the sum is less than the idle credit value. The first register is set to the idle credit value when the queue is empty and the sum has at least the idle credit value.

In an alternative embodiment, a rate shaper apparatus includes a multiplexer with a first input, a second input, a third input, and an output. The first input is the idle credit value. The second input is the sum of the adder. The third input selects between the first and second inputs. When the sum is below the idle credit value or the queue is not empty, the second input is selected. Otherwise, the first input is selected. The output is to the first register, which is loaded with the selected value.

In another embodiment of the invention, a method for packet-based traffic shaping utilizes the system described above. The method preferably includes enabling a queue to allow forwarding of a first packet if transmission credit has at least a minimum good credit value, reducing the transmission credit by a transmission cost associated with the first packet if the first packet is forwarded, restoring the transmission credit incrementally over time during an idle period to an idle credit value, and enabling the queue to allow forwarding of a second packet made available for forwarding after the idle period if transmission credit has at least the minimum good credit value.

Using the above-described techniques, accurate rate shaping is achieved in part by, after an idle period, enabling a queue so that a packet may be forwarded on credit without requiring the accrual of sufficient tokens to pay for the transmission cost of the packet. Accurate rate shaping is also achieved by not accumulating credits. Thus, in a preferred embodiment, traffic control includes allowing packets to be forwarded without accrued credit and requiring credit to be repaid before subsequent packets are forwarded, thereby reducing delay in forwarding packets after an idle period while also limiting large bursts after idle periods. An embodiment of the invention is easily implemented in hardware because necessary computation logic is as minimal as a single adder and subtractor in one embodiment, and no shifters are typically required. An embodiment is further easily implemented in hardware because it has a relatively small amount of data to maintain per queue, as few as 45 bits per rate shaper in a preferred embodiment. Moreover, dual rate shaping is easily implementable in accordance with an embodiment of the invention. In addition, the reduction in hardware complexity has an added benefit of potentially reducing errors over a given time period.

Exemplary figures illustrate embodiments of the invention that are easy to configure, economical in consumption of hardware resources, readily expandable to include multiple rate shapers, and can readily be used to shape traffic in existing networks. Other aspects and advantages of the present invention will become apparent from the following detailed description, taken in conjunction with the accompanying drawings, illustrating by way of example the principles of the invention.

DETAILED DESCRIPTION OF THE INVENTION

As shown in the drawings for the purposes of illustration, an embodiment of the invention is a traffic shaping system configured for use in a network with packet-based traffic. The system includes a scheduler and plurality of queues with associated shapers.

Figure 1:
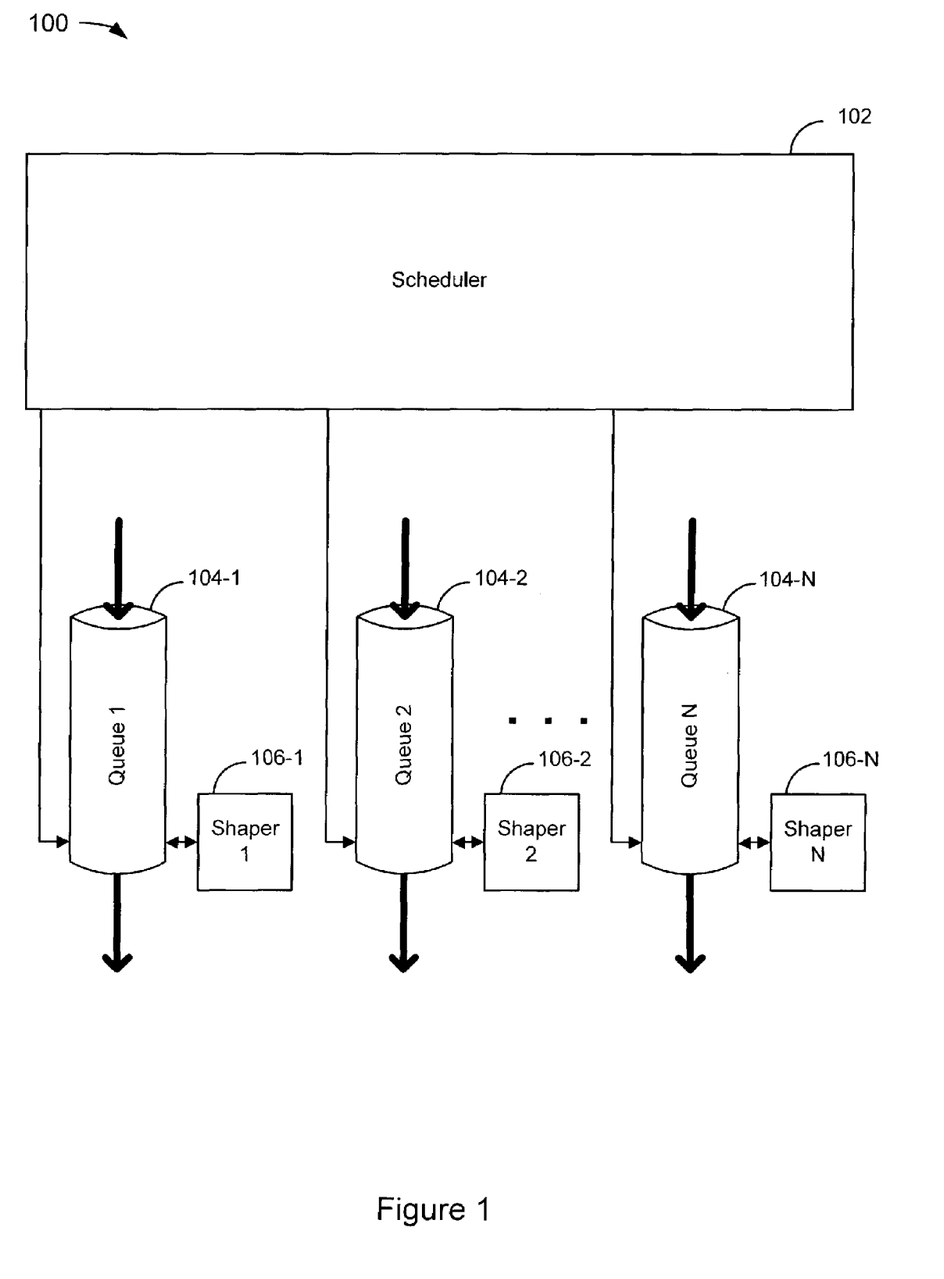
FIG. 1 is a block diagram of a traffic shaping system in accordance with an embodiment.

FIG. 1 is a block diagram of a packet-based traffic shaping system 100 in accordance with an embodiment. The system 100 includes a scheduler 102, a plurality of queues 104-1 to 104-N, and a plurality of shapers 106-1 to 106-N. FIG. 1 is a logical depiction and is not intended to illustrate an actual physical layout of the various components of the system 100. The scheduler 102 may use a round-robin scheduling algorithm that jumps from a first queue, e.g., the queue 104-1 to a second queue, e.g., the queue 104-2, eventually to a last queue, e.g., the queue 104-N, and then back to the first queue once more. The scheduler 102 may also use priority scheduling. Unused or excess bandwidth may be distributed based on round-robin or priority scheduling. The queue 104-1 is configured to receive a plurality of packets. These packets are represented in FIG. 1 by the thick arrow pointing toward the top of the queue 104-1. The queue 104-1 is coupled to an associated shaper 106-1. The shaper 106-1 is logically located at the head of the queue 104-1 and controls the rate of output of the packets from the queue 104-1. The output packets are represented in FIG. 1 by the thick arrow pointing out of the bottom of the queue 104-1. When the shaper 106-1 enables the queue 104-1, then the scheduler 102 may forward a packet from queue 104-1 in accordance with its scheduling algorithm. The shaper 106-1 maintains a transmission credit and enables the queue 104-1 when the transmission credit has at least a minimum good credit value. In a preferred embodiment, the minimum good credit value is greater than zero. If the shaper 106-1 does not enable the queue 104-1, then, in general, packets are not forwarded from the queue 104-1. The queues 104-2 to 104-N are similar to the queue 104-1, just described. The shapers 106-2 to 106-N are similar to the shaper 106-1, just described, though they may or may not have the same traffic control implementation.

Figure 2:
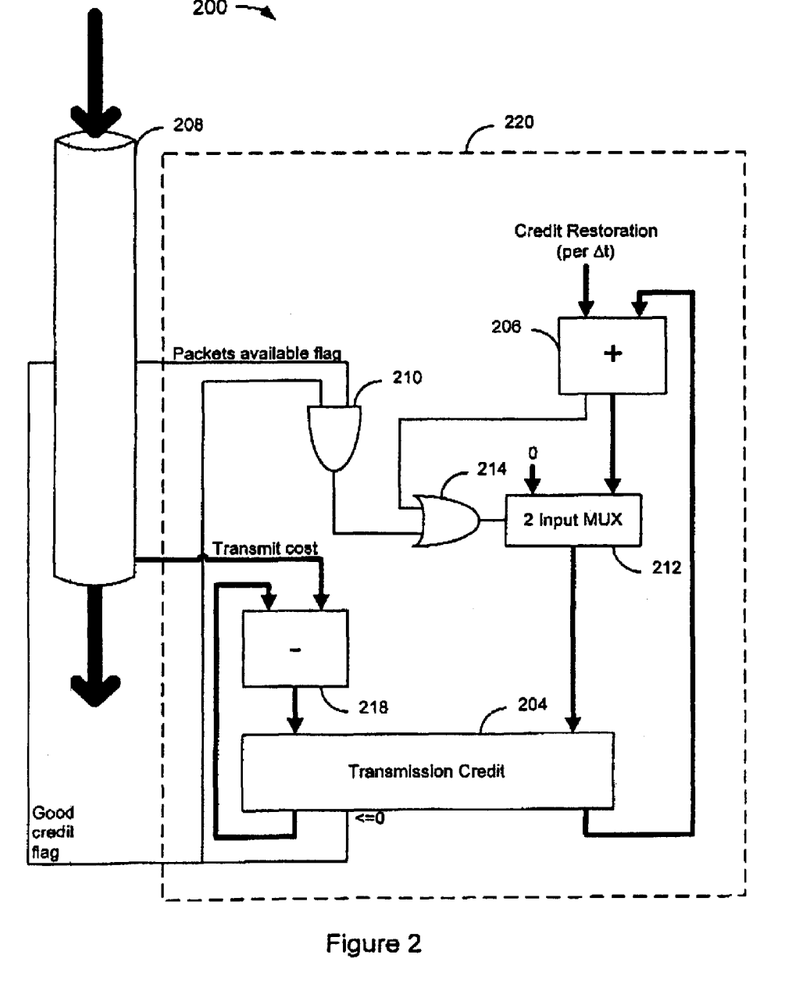
FIG. 2 is a block diagram of a rate shaper in accordance with an embodiment, for use in the system of FIG. 1.

FIG. 2 is a block diagram of a subsystem 200 in an embodiment of system 100 including a shaper 220 and an associated queue 208. This FIG. is intended to illustrate the logical format of the shaper 220. The shaper 220 reduces a transmission credit when a packet is forwarded from the queue 208. The shaper 220 also increments transmission credit when the queue 208 is not empty (i.e., when there are more packets in the queue 208) and the transmission credit is less than a minimun good credit value or during an idle period to restore transmission credit to an idle credit value. As used herein, the queue 208 has "good credit" when the transmission credit is at least a minimum good credit value and "bad credit" when the transmission credit is less than the minimum good credit value. As illustrated, the shaper 220 has two inputs, a flag indicating that packets are available, i.e., that a packet has been enqueued on the queue 208, and a transmit ("transmission") cost associated with a packet at the head of the queue 208, where the transmission cost is a value that is proportional to the packet size in bits of the packet at the head of the queue. The shaper 220 has a good credit flag output that serves to enable the queue 208.

The shaper 220 includes a transmission credit register 204, an adder 206, a 2 input multiplexer (MUX) 212, a logical OR gate 214, and a subtractor 218. The adder 206 has two inputs, the contents of the transmission credit register 204 and a credit restoration (per $\Delta t$) constant. The credit restoration constant may be contained in a register in shaper 220 or input into the shaper 220. The first input to the MUX 212 is the idle credit value. The second input to the MUX 212 is the sum of the adder 206. In this embodiment, the idle credit value is 0. The MUX 212 selects between the first input and the second input depending upon the value of a third input, which is the output of the OR gate 214. The OR gate has two inputs, the packets available flag and the sign bit of the adder 206. In this embodiment, the sign bit of the adder 206 is '1' when the sum is negative and '0' when the sum is positive. Also in this embodiment, the packets available flag is '1' when a packet is enqueued in the queue 208 and '0' when the queue 208 is empty. The first input is selected if the output of the OR gate 214 is '0' and the second input is selected if the output of the OR gate 214 is '1'. Accordingly, the MUX 212 selects the sum of the adder 206 if the sum is negative or the queue 208 is not empty. In other words, transmission credit is incremented if the queue 208 is not idle and the transmission credit is not already greater than the idle credit value, or transmission credit is less than the idle credit value. Conversely, transmission credit is not incremented if the queue is idle and the transmission credit has the idle credit value. Therefore, transmission credit is restored incrementally over time by the credit restoration constant, but does not accrue credit while the queue 208 is idle.

The subtractor 218 subtracts from the transmission credit the transmission cost associated with the packet at the head of the queue 208. The result is loaded into the transmission credit register 204. In this way, transmission credit is reduced by the transmission cost when a packet is forwarded from the queue 208. The good credit flag ensures that the queue 208 is enabled only when the transmission credit register 204 has at least a minimum good credit value. In this embodiment, the good credit flag is '0' when the transmission credit register 204 is zero or has a negative value and '1' when the transmission credit register 204 has a positive value. When the transmission credit becomes bad due to the transmission cost associated with forwarding a packet, the transmission credit is restored incrementally over time using the adder 206 as described previously.

Figure 3:
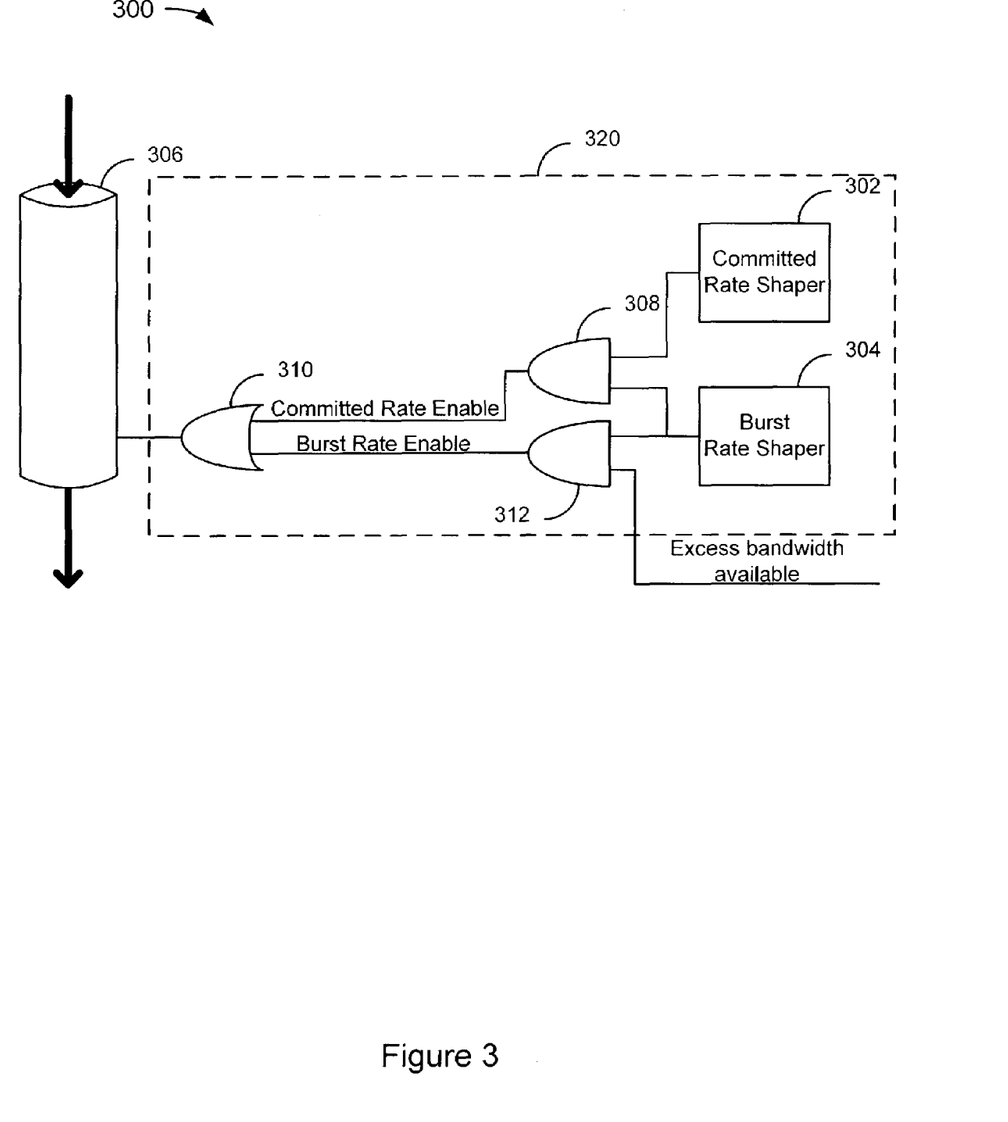
FIG. 3 is a block diagram of a dual rate shaper in accordance with an embodiment, for use in the system of FIG. 1.

FIG. 3 is a block diagram of a subsystem 300 of system 100 including a dual rate shaper 320 and an associated queue 306. An input to the dual rate shaper 320 is an excess bandwidth available flag. An output of the dual rate shaper 320 is a good credit flag. FIG. 3 is intended to illustrate the logical format of the dual rate shaper 320. It should be noted that FIG. 3 is not intended to represent the actual physical configuration of the subsystem 300. The dual rate shaper 320 is a dual rate shaper because it includes two rate shaping circuits, a committed rate shaper 302 and a burst rate shaper 304, which are similar to the shaper 220 (FIG. 2). The credit restoration (per $\Delta t$) of the committed rate shaper 302 is referred to herein as a committed credit restoration amount and the transmission credit of the committed rate shaper 302 is referred to herein as committed credit. The credit restoration (per $\Delta t$) of the burst rate shaper 304 is referred to herein as a burst credit restoration amount and the transmission credit of the burst rate shaper 304 is referred to herein as burst credit. A packet may be forwarded as per committed rate or burst rate. The packet is forwarded as per committed rate if the committed rate enable flag is high. The packet is forwarded as per burst rate if the committed rate enable flag is low and burst rate enable flag is high. The burst credit restoration amount is preferably higher than the committed credit restoration amount. Burst credit is used to forward packets that would otherwise exceed an allowed committed rate for the dual rate shaper 320. That is, if packets cannot be forwarded according to the committed rate shaper, the packets may be forwarded according to the burst rate shaper. The burst rate shaper allows packets to be forwarded if the burst credit is available and if there is excess bandwidth, the availability of which is indicated by the excess bandwidth available input to the dual rate shaper 320. It should be noted that in a preferred embodiment, the dual rate shaper 320 subtracts the transmission cost of every packet sent from burst credit, but only subtracts transmission cost from committed credit if packets are forwarded on committed credit. Accordingly, since the committed credit restoration amount is proportional to the committed rate, the burst credit should be restored faster than the committed credit. Therefore, the burst credit restoration amount is preferably higher than the committed credit restoration amount. Thanks to the relatively large credit restoration amount in the burst rate shaper 304, burst credit is restored more rapidly than committed credit.

When a packet is forwarded from the queue 306, the burst credit of the burst rate shaper 304 and the committed credit of the committed rate shaper 302 are decreased by the transmission cost associated with the packet. The queue 306 is enabled to allow forwarding when at logical OR gate 310, either the committed rate enable flag or the burst rate enable flag are on. The committed rate enable flag is on if at AND gate 308 both the committed rate shaper 302 and the burst rate shaper 304 have good credit. The burst rate enable flag is on if at logical AND gate 312 the burst rate shaper 304 has good credit and excess bandwidth is available. As long as excess bandwidth is available, the burst credit is reduced each time a packet is forwarded, but the committed credit is reduced only when the committed credit is good. This may be accomplished by, e.g., enabling the subtractor of the committed rate shaper 302 with the good credit flag of the committed credit register (not illustrated).

Figure 4A:
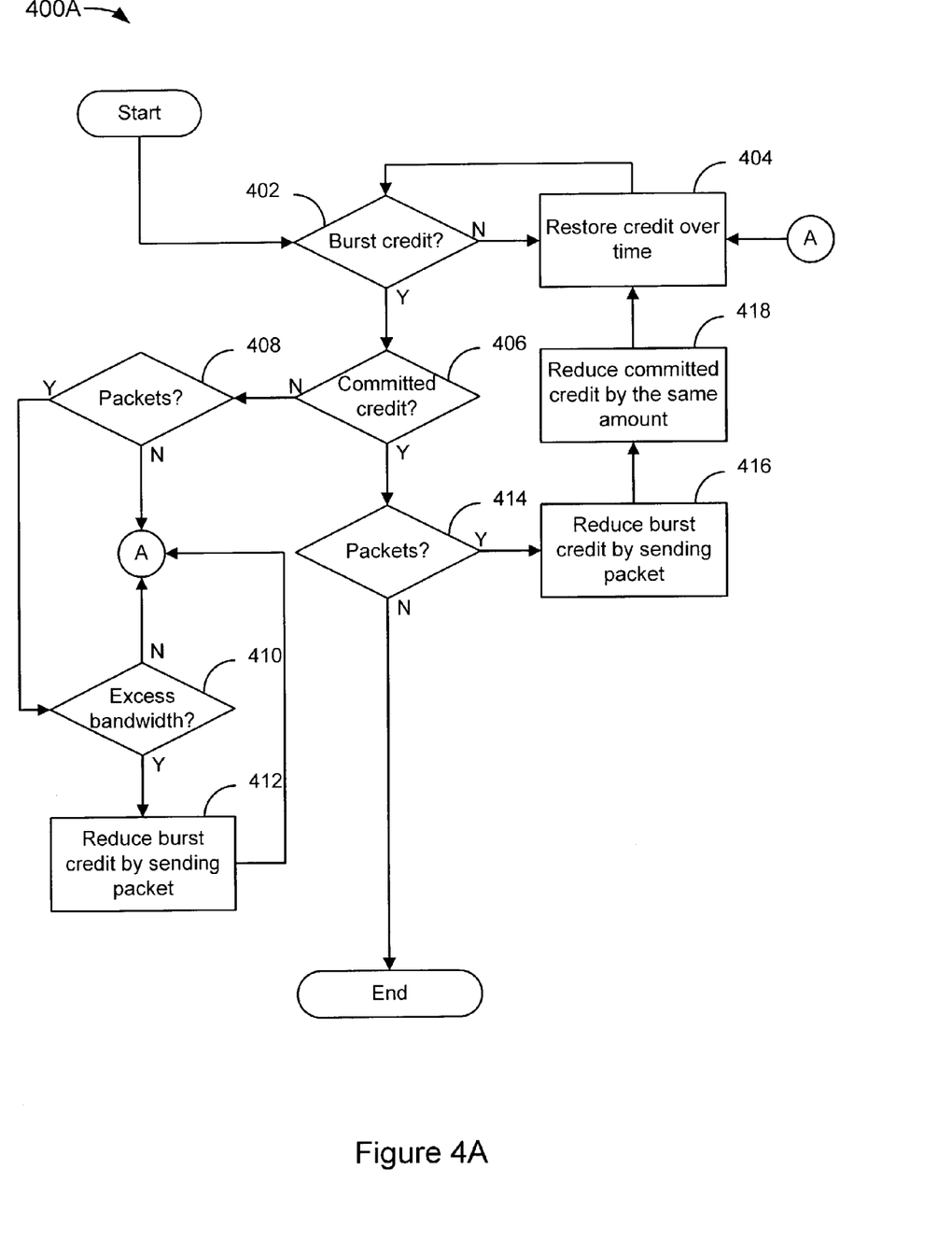
FIGS. 4A and 4B are flow charts of methods in accordance with embodiments, to be implemented by the system of FIG. 1.

FIG. 4A is a flowchart 400A of an embodiment of a method for packet-based traffic shaping. FIG. 4A is intended to illustrate logical steps taken in determining whether to send packets on both committed credit and burst credit or burst credit only, and when credits are restored over time. FIG. 4A illustrates logical functionality; the steps may or may not correspond to actual steps implemented in hardware or software. Flowchart 400A starts when a packet is available for forwarding by checking burst credit at step 402. If burst credit is unavailable (402-N), credit is restored incrementally over time at step 404. Note that if the method is implemented in a committed rate shaper, as opposed to, e.g., a dual rate shaper, then the burst credit equals the committed credit. Credit is considered to be unavailable (i.e., the credit is "bad") when credit is less than a minimum good credit value. Credit is considered to be "good" when the credit is at least the minimum good credit value. The minimum good credit value is preferably the same for both burst and committed credit. However, in an alternative embodiment, a minimum good burst credit value and a minimum good committed credit value are not the same value. Step 404 preferably includes either incrementing burst credit by a predetermined amount per time increment $\Delta t$ or setting burst credit to an idle credit value if restoring incrementally would result in burst credit exceeding the idle credit value when no additional packets are available for forwarding. Both committed credit and burst credit are incremented at step 404. When burst credit is good (step 402-Y), committed credit is checked at step 406. Note that if the method is implemented in a committed rate shaper, as opposed to, e.g., a dual rate shaper, since the burst credit equals the committed credit, committed credit is always good at step 406. When committed credit is bad (step 406-N) and no packets are available for forwarding at step 408, the committed credit is simply restored over time at step 404. When committed credit is bad at step 404, committed credit is incremented by a predetermined amount or set to the idle credit value if restoring incrementally would result in committed credit exceeding the idle credit value when no additional packets are available for forwarding. The idle credit value is preferably the same for both burst and committed credit. However, in an alternative embodiment, an idle burst credit value and an idle committed credit value are not the same value. Note that the committed credit restoration increment is preferably smaller than the burst credit restoration increment, resulting in a relatively slower restoration of committed credit over time. When committed credit is bad (step 406-N), but there is a packet available for forwarding (step 408-Y), if there is excess bandwidth available at step 410, then the packet is forwarded and burst credit is reduced by a transmission cost associated with the packet at step 412. Burst credit is reduced by, e.g., subtracting the transmission cost from the burst credit. In this case, the packet is forwarded on burst credit only; committed credit is not reduced by the transmission cost of the packet. If the committed credit is good (step 406-Y), but there are no packets available for forwarding at step 414, then the flowchart 400 ends. In this case, even though there is credit, there are no packets to be forwarded. If committed credit is good (step 406-Y) and a packet is available (step 414-Y), then the packet is forwarded, burst credit is reduced by the transmission cost at step 416, and committed credit is reduced by a transmission cost associated with the packet at step 418. Then the burst credit and committed credit are restored incrementally over time at step 404.

Figure 4B:
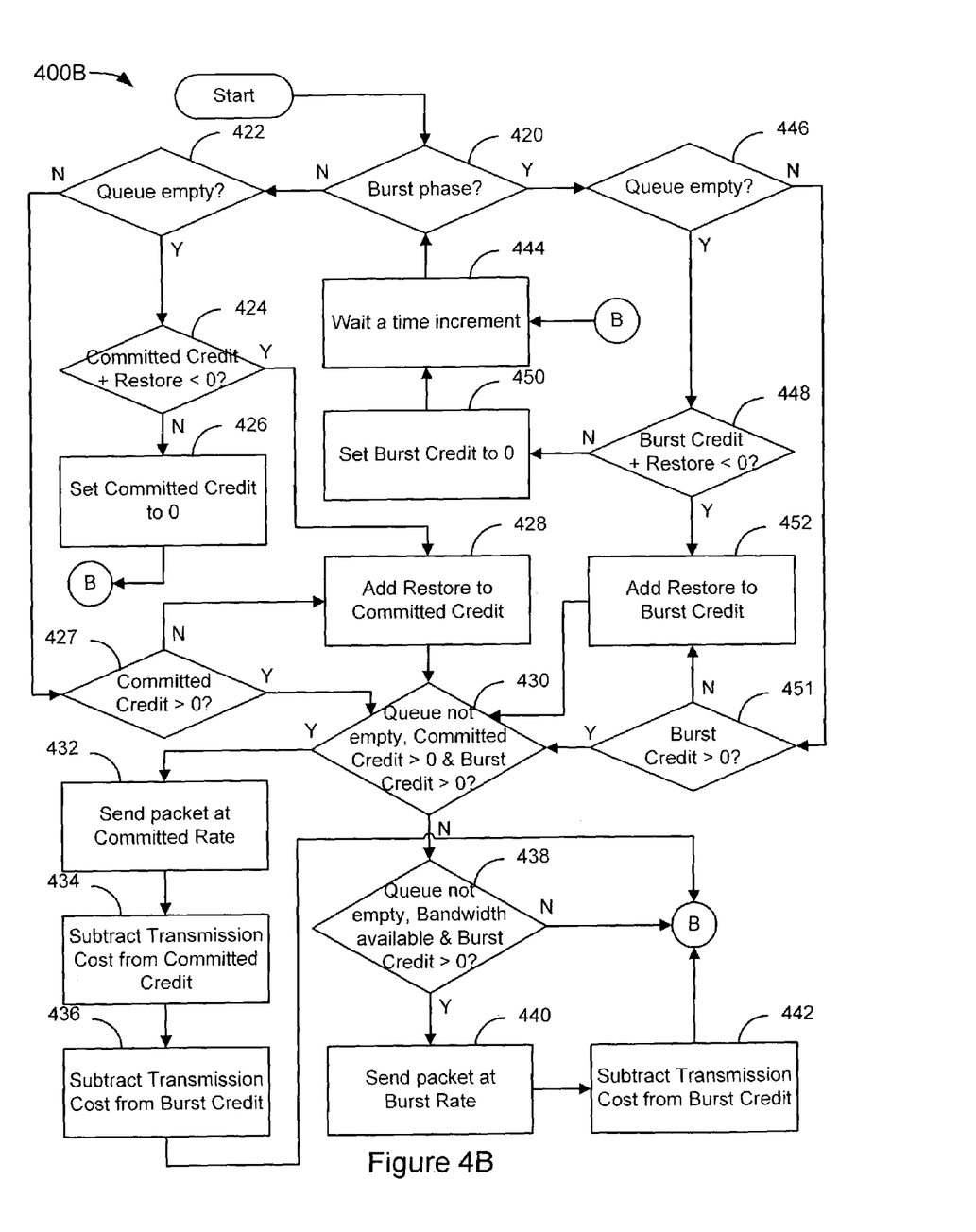

FIG. 4B is an alternative flow chart 400B of an embodiment of a method for packet-based traffic shaping. FIG. 4B is intended to illustrate steps in an embodiment in which an idle credit value is zero and a minimum good credit value is greater than zero. The flow chart 400B has two phases that may overlap. The phases are a committed rate phase and a burst rate phase. The two sides of the flow chart, where the burst credit is restored, and committed credit is restored, happen in parallel. If not in the burst phase at step 420, then the committed rate phase is initiated by checking whether the queue is empty at step 422. If the queue is empty and committed credit plus a committed credit restoration amount is greater than or equal to zero at step 424, the committed credit is set to zero (or remains zero if the committed credit was already zero) at step 426 and the flowchart 400B starts again at step 420. In this case, the queue is idle (i.e., it is empty) and incrementing committed credit would raise the credit to or above the idle credit value (e.g., zero). If, on the other hand, the queue is not empty (422-N) and committed credit is not greater than zero at step 427, or the queue is empty (422-Y) and committed credit plus a committed credit restoration amount is less than zero (424-Y), then committed credit is incremented by the committed credit restoration amount at step 428. In this case, either the queue is not idle (i.e., packets are enqueued) or a committed credit deficit is being paid off during an idle period. If committed credit is greater than zero (427-Y) committed credit is not incremented; credit does not accrue. After step 427 or 428, if the queue is not empty, the committed credit is greater than zero, and the burst credit is greater than zero at step 430, then the packet is sent at committed rate at step 432. A transmission cost associated with the packet is subtracted from the committed credit at step 434 and from the burst credit at step 436; then the flowchart 400B waits a time increment at step 444 and starts again at step 420. If, on the other hand, the queue is empty or committed credit is not greater than zero or burst credit is not greater than zero (430-N), then if the queue is not empty, excess bandwidth is available, and burst credit is greater than zero at step 438, then the packet is sent at burst rate at step 440 and burst credit is reduced by the transmission cost associated with the packet at step 442, the flowchart 400B waits a time increment at step 444 and starts again at step 420. If at step 438 the queue is empty, bandwidth is not available, or the burst credit is not greater than zero, then the flowchart 400B waits a time increment at step 444 and starts again at step 420. In this case, waiting a time increment simply allows time to increment credit, since the credit restoration amount (either committed or burst) is the amount restored per time increment.

When in the burst phase (420-Y), if the queue is empty at step 446 and the burst credit plus the burst credit restoration amount is greater than or equal to zero at step 448, then the burst credit is set to zero at step 450, the flowchart 400B waits a time increment at step 444, and the flowchart 400B starts again at step 420. If, on the other hand, the queue is not empty (446-N) and burst credit is less than or equal to zero at step 451 or the queue is empty (446-Y) and burst credit plus the burst credit restoration amount is less than zero (448-Y), then the burst credit is incremented by the burst credit restoration amount at step 452. If burst credit is greater than zero at step 451, then burst credit is not incremented; credit does not accrue. If the queue is not empty, the committed credit is greater than zero, and the burst credit is greater than zero at step 430, then the packet is sent at committed rate, as described previously. If not, the packet is either sent burst rate, as described previously (438-Y) or the flowchart waits for a time increment (438-N), as described previously.

In a preferred embodiment, a burst rate phase and a committed rate phase operate in parallel. In accordance with this embodiment, a committed rate phase would start at step 422, a burst rate phase would start at step 446, and a scheduling phase would start at step 430.

Figure 5:
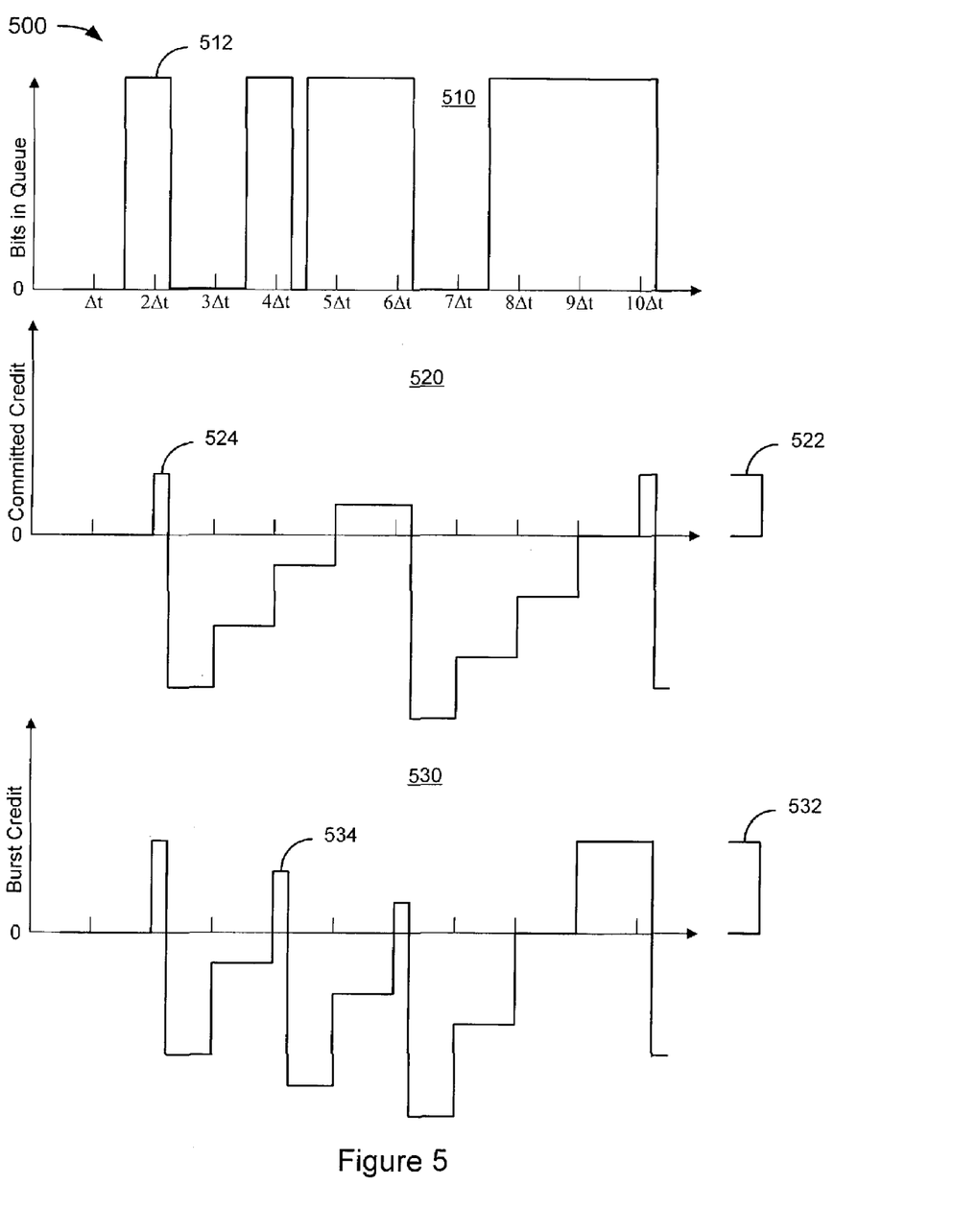
FIG. 5 is a graphical representation of credit fluctuation over time in accordance with an embodiment.

FIG. 5 is a graphical representation 500 of credit fluctuation over time in accordance with an embodiment. The representation 500 includes a queued bits graph 510, a committed credit graph 520, and a burst credit graph 530. The plots queued bits 512, committed credit 524, and burst credit 534 of the graphs 510, 520, and 530, respectively are intended to represent the number of bits in a queue, the committed credit, and the burst credit, respectively, at points over a period of time. Time is divided into increments of $\Delta t$, where each $\Delta t$ increment in each graph represents the same time increment in the other graphs. It should be noted that the committed credit 524 and burst credit 534 may or may not be represented in bits. Rather, they could be represented with discrete tokens representing a number of bits. For the purposes of illustration, the idle credit value is zero for both the committed credit 524 and the burst credit 534. Also for the purposes of illustration, the minimum good credit value is greater than zero for both the committed credit 524 and the burst credit 534. The committed credit 524 is increased by a committed credit restoration value 522 at each Δt interval if committed credit 524 is negative or the queued bits are greater than zero, unless committed credit 524 is greater than zero and burst credit is less than zero. The burst credit 534 is increased by a burst credit restoration value 532 at each Δt interval if burst credit 534 is negative or the queued bits are greater than zero, unless burst credit 534 is greater than zero, committed credit is less than or equal to zero, and excess bandwidth is not available. It is assumed for the purposes of illustration that excess bandwidth is available up to time 5Δt and not available at 5Δt and later.

Starting at time 0, the queued bits 512, committed credit 524, and burst credit 534 are zero. In the embodiment of FIG. 5, this is the idle value of the committed credit 524 and the burst credit 534. Since the queued bits 512 represents the number of bits in the queue, when the queued bits 512 is zero, the queue is empty.

At time Δt, the queue is still empty. Since credit does not accumulate when the queue is empty, the committed credit restoration value 522 is not added to the committed credit 524. Similarly, the burst credit restoration value 532 is not added to the burst credit 534. Accordingly, the committed credit 524 and burst credit 534 remain zero. Between time Δt and 2Δt, the queued bits 512 become greater than zero. This indicates that a first packet has been enqueued and the queue is no longer idle.

At time 2Δt, the committed credit 524 is incremented by the credit restoration value 522 to a value greater than zero. The burst credit 534 is incremented by the burst restoration value 532 to a value greater than zero. Between time 2Δt and 3Δt, the first packet is sent. Since both the committed credit 524 and the burst credit 534 are greater than zero, the first packet is sent on committed credit. When the first packet is sent on committed credit, the committed credit 524 and the burst credit 534 are decreased by the transmission cost of the first packet. In the embodiment of FIG. 5, decreasing the committed credit 524 and the burst credit 534 reduces both values to less than zero.

At time 3Δt, the committed credit 524 is incremented by the committed credit restoration value 522, but is still less than zero. Likewise, the burst credit 534 is incremented by the burst credit restoration value 532, but is still less than zero. Between time 3Δt and 4Δt, the bits in queue 512 are increased to greater than zero, which means a second packet has been enqueued.

At time 4Δt, the committed credit 524 is incremented by the committed credit restoration value 522, but is still less than zero. The burst credit 534, on the other hand, is incremented by the burst credit restoration value 532 to a value that is greater than zero. For illustrative purposes, it is assumed that excess bandwidth is available between time 4Δt and 5Δt. Since bandwidth is available and the burst credit 534 is greater than zero, the second packet is forwarded on burst credit and the burst credit 534 is decreased by the transmission cost of the second packet. Between time 4Δt and 5Δt, the bits in queue 512 are increased to greater than zero, which means a third packet has been enqueued.

At 5Δt, the committed credit 524 is incremented by the committed credit restoration value 522 to a value that is greater than zero. The burst credit 534, on the other hand, is incremented by the burst credit restoration value 532, but is still less than zero. The third packet is not sent between time 5Δt and 6Δt because the burst credit 534 is less than zero.

At time 6Δt, the committed credit 524 is not incremented because the committed credit 524 is greater than zero, but the burst credit 534 is less than zero. The burst credit 534, on the other hand, is incremented by the burst restoration value 532 to a value greater than zero. Since both the committed credit 524 and the burst credit 534 are greater than zero, the third packet is sent on committed credit. When the first packet is sent on committed credit, the committed credit 524 and the burst credit 534 are decreased by the transmission cost of the third packet.

At time 7Δt, the committed credit 524 is incremented by the committed credit restoration value 522, but is still less than zero. Likewise, the burst credit 534 is incremented by the burst credit restoration value 532, but is still less than zero. Between time 7Δt and 8Δt, the bits in queue 512 are increased to greater than zero, which means a fourth packet has been enqueued.

At time 8Δt, the committed credit 524 is incremented by the committed credit restoration value 522, but is still less than zero. The burst credit 534 is incremented by the burst credit restoration value 532 to zero. In the embodiment of FIG. 5, zero is less than the minimum good credit value. Accordingly, the fourth packet remains enqueued between time 8Δt and 9Δt.

At time 9Δt, the committed credit 524 is incremented by the committed credit restoration value 522 to zero. The burst credit 534 is incremented by the burst restoration value 532 to a value greater than zero. For illustrative purposes, it is assumed that excess bandwidth is not available after time 5Δt. Since bandwidth is not available, even though the burst credit 534 is greater than zero, the fourth packet is not forwarded.

At time 10Δt, the committed credit 524 is incremented by the committed credit restoration value 522 to a value greater than zero. The burst credit 534 is not incremented because the burst credit 534 is greater than zero, but the committed credit 524 was less than zero. Since both the committed credit 524 and the burst credit 534 are greater than zero, the fourth packet is sent on committed credit some time after 10Δt.

Figure 6:
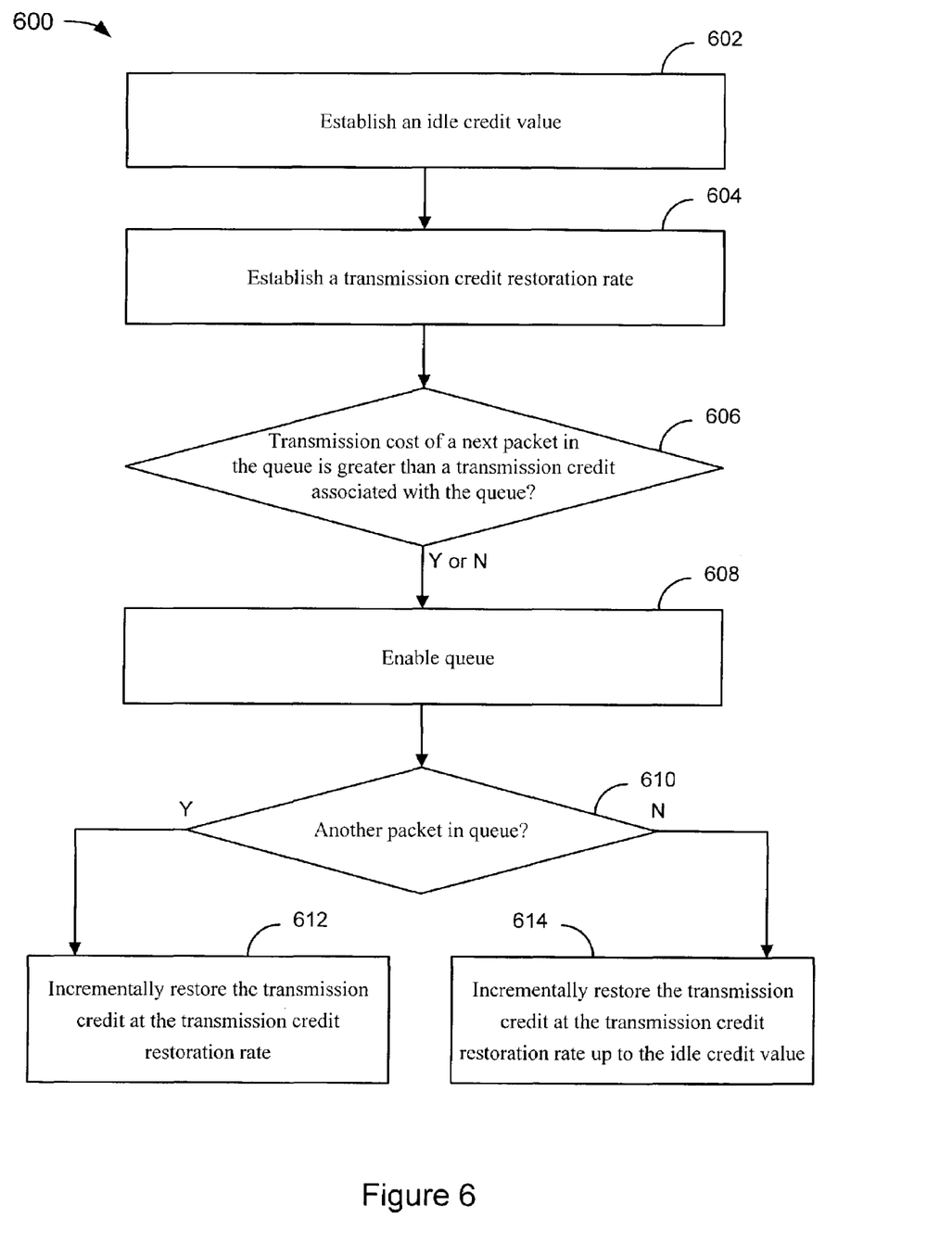
FIG. 6 is a flow chart of a method in accordance with an embodiment.

FIG. 6 is a flowchart 600 of a method in accordance with an embodiment of the invention. Flowchart 600 is intended to illustrate that a packet may be forwarded from a queue even if a transmission cost associated with the packet is greater than a transmission credit associated with the queue and that if a queue is idle, credit does not accrue beyond an idle credit value. Initially, an idle credit value is established at step 602. The idle credit value may be established by storing the value in a register, hardwiring a shaper to have the value, or by some other technique. In one embodiment, the idle credit value is established to be zero. A transmission credit restoration rate is established at step 604. The transmission credit restoration rate may be established by storing the value in a register, providing the value as an input, or by some other technique. A queue associated with the transmission credit restoration rate is enabled at step 608 even when a transmission cost of a next packet in the queue is greater than a transmission credit that is associated with the queue (606-Y or 606-N). If there is another packet in the queue at step 610, then the transmission credit is incrementally restored at the transmission credit restoration rate at step 612. If there is not another packet in the queue at step 610, then the transmission credit is incrementally restored at the transmission credit restoration rate up to the idle credit value at step 614.

Figure 7:
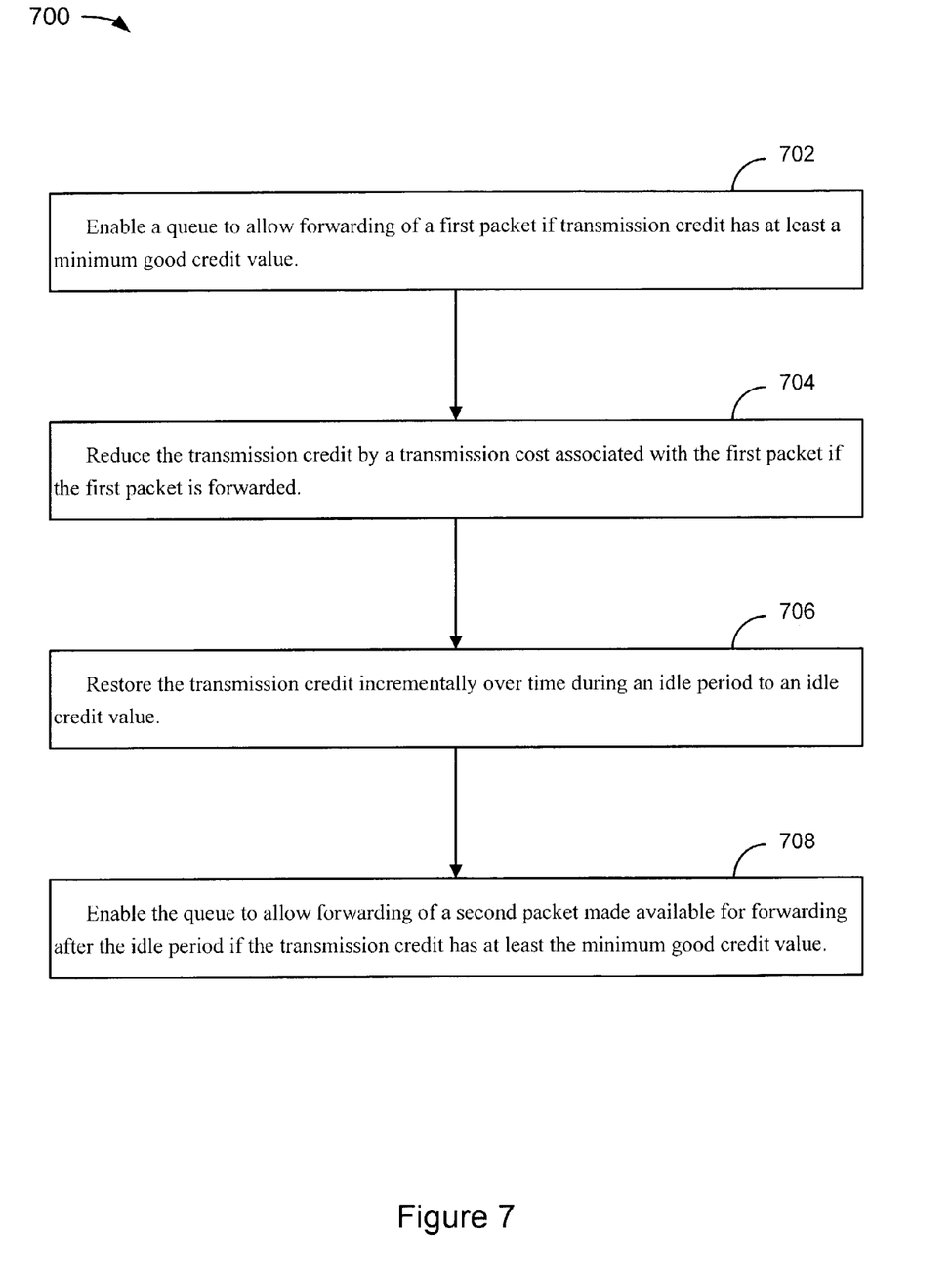
FIG. 7 is a flow chart of a method in accordance with an embodiment.

FIG. 7 is a flowchart 700 of a method in accordance with an embodiment. Flowchart 700 is intended to illustrate what happens when a packet is forwarded, leaving a queue idle for a period of time, and then another packet is forwarded after the idle period. The queue is enabled to allow forwarding of a first packet if the transmission credit has at least a minimum good credit value at step 702. In a preferred embodiment, the minimum good credit value is greater than zero. The transmission credit is reduced by the transmission cost of the packet at step 704. At this point, the queue is empty. For the purposes of this example, the queue remains empty while at step 706 the transmission credit is restored incrementally over time to an idle credit value. In a preferred embodiment, the idle credit value is zero. The idle credit value is the maximum value to which the transmission credit may be incremented and remains at the idle credit value until the queue is no longer empty. After the idle period, a second packet is made available so the queue is enabled if the transmission credit has at least the minimum good credit value at step 708. In a preferred embodiment, achieving the minimum good credit value after an idle period during which the transmission credit is incremented to the idle credit value is accomplished in a single time increment. It should be noted that the minimum good credit value of step 702 and step 708 are the same minimum good credit value. In other words, the minimum good credit value does not fluctuate depending upon the size of the packet that is to be sent; the minimum good credit value is not packet-size-dependent. In this way, it is possible to forward the second packet without undue delay, regardless of the size of the second packet, following the idle period, without allowing the transmission credit to accrue above the idle credit value during the idle period.

In one embodiment, the method steps described above are embodied in a computer-readable media as computer instruction code. It shall be appreciated that not all methods steps described must be performed, nor must they be performed in the order stated.

The term credit is defined broadly, as used herein. Discrete units of credit may be in bits, tokens, or some other form. The terms tokens and credit may be used interchangeably. Furthermore, good credit is defined as a positive value and bad credit is defined as a negative value, but these values could be logically reversed (or good credit could be represented by zero or a negative value).

Although specific embodiments of the invention have been described and illustrated, the invention is not to be limited to the specific forms or arrangements of parts as described and illustrated herein. The invention is limited only by the claims.

What is claimed is:

1. A method for packet-based traffic shaping, comprising:
   establishing an idle credit value and a transmission credit restoration rate;
   enabling a queue irrespective of whether a transmission cost of a next packet in said queue is greater than a transmission credit that is associated with said queue, wherein the transmission cost is a value that is proportional to the packet size in bits of the next packet in said queue;
   if there is another packet in said queue, incrementally restoring said transmission credit at said transmission credit restoration rate; and
   if there is not another packet in said queue, incrementally restoring said transmission credit at said transmission credit restoration rate up to said idle credit value.

2. The method of claim 1, wherein said idle credit value is zero.

3. A system for controlling packet-based traffic flow, comprising:
   a plurality of queues configured to hold a plurality of packets until said plurality of packets are forwarded;
   a rate shaper, associated with a queue of said plurality of queues, configured to:
   enable said queue to allow forwarding of a first packet if transmission credit has at least a minimum good credit value;
   reduce said transmission credit by a transmission cost associated with said first packet if said packet is forwarded, wherein the transmission cost is a value that is proportional to the packet size in bits of the first packet;
   restore said transmission credit incrementally over lime during an idle period to an idle credit value, wherein during an idle period the queue does not hold a packet; and
   enable said queue to allow forwarding of a second packet made available for forwarding after said idle period when said transmission credit has at least said minimum good credit value; and
   a scheduler, coupled to said plurality of queues, that forwards packets from said queue in accordance with a scheduling algorithm if said queue is enabled;
   wherein said rate shaper is further configured to:
   set said transmission credit to said idle credit value if incrementally restoring said transmission credit would result in said transmission credit exceeding said idle credit value, unless an additional packet is available for forwarding.

4. The system of claim 3, wherein said rate shaper is configured to reduce transmission credit by a transmission cost associated with said packet, and restore said transmission credit incrementally during a non-idle period.

5. The system of claim 3, wherein said minimum good credit value is greater than zero.

6. The system of claim 3, wherein said idle credit value is zero.

7. The system of claim 6, wherein said minimum good credit value is greater than zero.

8. The system of claim 3, wherein said rate shaper is a committed rate shaper and said transmission credit is committed credit.

9. The system of claim 8, further comprising:
   a burst rate shaper associated with said queue that enables said queue even if said committed credit is below said minimum good credit value when burst transmission credit associated with said queue is at least said minimum good credit value and excess bandwidth is available.

10. The system of claim 9, wherein said burst rate shaper is configured for reducing burst transmission credit by a transmission cost associated with said packet, and restoring said burst transmission credit incrementally over time.

11. The system of claim 9, wherein said burst rate shaper is configured for reducing burst transmission credit by a transmission cost associated with a packet that is sent when said committed credit is below said minimum good credit value, and restoring said burst transmission credit incrementally over time.

12. The system of claim 9, wherein said scheduler further comprises a priority scheme to distribute excess bandwidth to queues of a subset of said plurality of queues.

13. A rate shaper apparatus for use with a scheduler to accomplish rate shaping in a packet-based network, comprising:
   a register containing a first value corresponding to transmission credit associated with a queue, wherein said first value has an idle credit value after an idle period, and wherein said queue is enabled when said first value has a predetermined minimum good credit value;

a subtractor for subtracting from said first value a transmission cost associated with a packet dequeued from said queue when said first value has said minimum good credit value, wherein the transmission cost is a value tat is proportional to the packet size in bits of the dequeued packet and wherein the result of said subtracting is loaded into said register;

an adder for adding to said first value a second value corresponding to an amount of credit restored in a time increment, wherein a sum of said adding is loaded into said register if either another packet is enqueued, or said sum is less than said idle credit value, wherein said register is set to said idle credit value when said queue is empty and said sum has at least said idle credit value; and a multiplexer having a first input that has said idle credit value, a second input that has said sum, wherein said sum is selected when said sum is below said idle credit value or said queue is not empty and otherwise said idle credit value is selected, and an output coupled to said register for loading said sum or said idle credit value.

14. The apparatus of claim 13, wherein said minimum good credit value is greater than zero.

15. The apparatus of claim 13, wherein said idle credit value is zero.

16. The apparatus of claim 15, wherein said minimum good credit value is greater than zero.

17. A method for packet-based traffic shaping, comprising:

enabling a queue to allow forwarding of a first packet if transmission credit has at least a minimum good credit value;

reducing said transmission credit by a transmission cost associated with said first packet if said first packet is forwarded, wherein the transmission cost is a value that is proportional to the packet size in bits of the first packet;

restoring said transmission credit incrementally over time during an idle period to an idle credit value, wherein during an idle period said queue does not hold a packet;

enabling said queue to allow forwarding of a second packet made available for forwarding after said idle period if transmission credit has at least said minimum good credit value; and setting said transmission credit to said idle credit value if said restoring incrementally would result in said transmission credit exceeding said idle credit value, unless an additional packet is available for forwarding.

18. The method of claim 17, wherein said minimum good credit value is greater than zero.

19. The method of claim 17, wherein said idle credit value is zero.

20. The method of claim 19, wherein said minimum good credit value is greater than zero.

21. The method of claim 17, wherein said transmission credit is a committed rate credit.

22. The method of claim 17, further comprising:

subtracting a transmission cost associated with said packet from burst credit if said packet is forwarded; and restoring said burst credit incrementally over time.

23. The method of claim 22, further comprising:

setting said burst credit to said idle credit value if said restoring burst credit incrementally would result in said burst credit exceeding said idle credit value, unless additional packets are available for forwarding.

24. The method of claim 17, further comprising:

sending said packet when said transmission credit is less than said minimum good credit value if burst credit has at least said minimum good credit value;

subtracting a transmission cost associated with said packet from said burst credit if said packet is sent; and restoring said burst credit incrementally over time.

25. The method of claim 24, further comprising:

setting said burst credit to said idle credit value if said restoring incrementally would result in said burst credit exceeding said idle credit value unless additional packets are available for sending.

* * * * *